United States Patent [19]

Farrand et al.

[11] Patent Number: 4,513,784
[45] Date of Patent: Apr. 30, 1985

[54] CHECK VALVE ASSEMBLY
[75] Inventors: Robert M. Farrand, Saginaw, Mich.; Daniel Puzio, Boonton, N.J.
[73] Assignee: General Motors Corporation, Detroit, Mich.
[21] Appl. No.: 601,428
[22] Filed: Apr. 18, 1984
[51] Int. Cl.³ .............................................. F16K 15/14
[52] U.S. Cl. ................................. 137/854; 137/516.11
[58] Field of Search ........... 137/512.15, 515.5, 516.11, 137/843, 854

[56] References Cited
U.S. PATENT DOCUMENTS 2,579,855  12/1951  Pockel ................................. 137/854
2,620,133  12/1952  Obermaier ....................... 137/854 X
4,369,812   1/1983  Paradis ................................. 137/843
4,416,445  11/1983  Coad .

FOREIGN PATENT DOCUMENTS 2315870  10/1974  Fed. Rep. of Germany ...... 137/854

Primary Examiner—Robert G. Nilson
Attorney, Agent, or Firm—R. L. Phillips

[57] ABSTRACT

A check valve assembly is disclosed having a valve chamber with an inlet port and an outlet port. An elastomeric umbrella valve is contained in the chamber between the ports and is attached by an integral stem in a preloaded condition to normally close the inlet port and be deflectable in response to differential fluid pressure acting in one direction to open same to permit forward fluid flow therethrough past the valve and through the chamber to the outlet port. An inwardly projecting retention arrangement formed in the chamber retains the valve in operational relationship with the inlet port in the event the valve becomes unattached so that any backward flow from the outlet port still forces closure of the valve on same. A bypass channel arrangement also formed in the chamber maintains forward fluid flow past the valve to the outlet port in the event the valve becomes unattached.

3 Claims, 3 Drawing Figures

CHECK VALVE ASSEMBLY

TECHNICAL FIELD

This invention relates to check valve assemblies and more particularly to those employing an elastomeric umbrella valve.

BACKGROUND OF THE INVENTION

In check valve assemblies employing an elastomeric umbrella valve, the latter typically has an integral stem by which it is normally attached in a preloaded position of closure and is deflectable in response to differential pressure to assume an open position permitting flow therepast in one direction only. It has been found that should the valve become unattached for some reason such as fatigue of the stem, it may be forced by the fluid pressure into a flow blockage position preventing the desired one way flow and not thereafter capable of assuming a closure position preventing flow in the opposite direction.

SUMMARY OF THE INVENTION

The present invention solves this problem with a chamber for the umbrella valve whose walls are formed so as to retain the valve in an operational position in the event that the valve becomes unattached while also assuring that the valve cannot then block flow in the normal one-way direction. In the preferred embodiment, the check valve assembly comprises only three parts with the chamber formed by a plastic housing and cover which are sonically welded together to seal the chamber after the umbrella valve has been attached by its stem within and to the housing. The housing has an inlet port to the valve chamber and the cover has an outlet port therefrom and the valve is normally preloaded in its attached position to close the inlet port. The valve is then deflectable in response to differential pressure acting in one direction thereon to open the inlet port and is forced to close same by the preload and any backflow. The chamber is defined by an interior side wall in the housing and two oppositely facing interior end walls in the housing and the cover. More particularly, the interior side wall of the chamber is formed with angularly spaced, inwardly projecting ribs that are spaced with respect to the periphery of the valve so as to retain same in operational relationship with the inlet port in the event the valve becomes unattached from the housing and the normal valve position and thus preload is lost. In addition, the interior end wall of the chamber in the cover is formed with angularly spaced, inwardly projecting ribs that define bypass channels which maintain connection between the chamber and the outlet port in the event that the valve becomes unattached from the housing and would otherwise close the outlet port. Moreover, the housing, cover and valve are simple designs adapted for production molding and automated assembly.

These and other objects, advantages and features of the present invention will become more apparent from the following description and drawing in which:

DESCRIPTION OF PREFERRED EMBODIMENT

Figure 1:
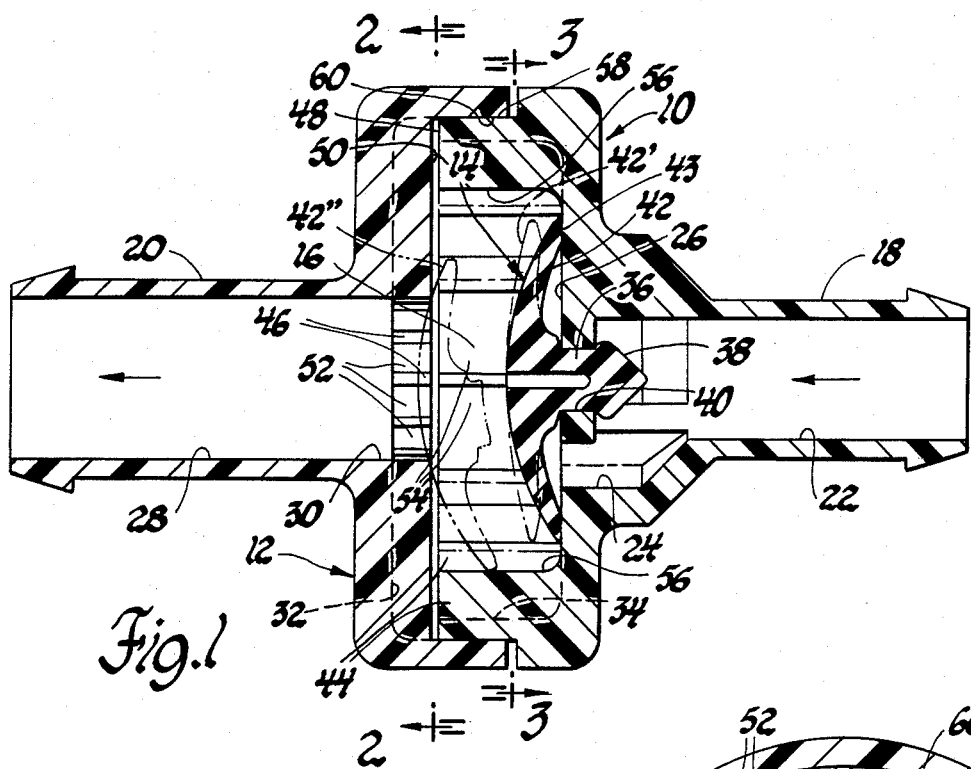
FIG. 1 is a longitudinal sectional view of the preferred embodiment of the check valve assembly constructed according to the present invention.

Referring to FIG. 1, the check valve assembly thereshown comprises three parts; namely, a housing 10, cover 12 and an umbrella valve 14 which is mounted in a sealed valve chamber 16 defined by the housing and cover. The housing 10 and cover 12 are cylindrically shaped and also have axially aligned but different sized nipples 18 and 20, respectively, by which the check valve assembly is adapted to be connected in a fluid line (not shown).

Figure 2:
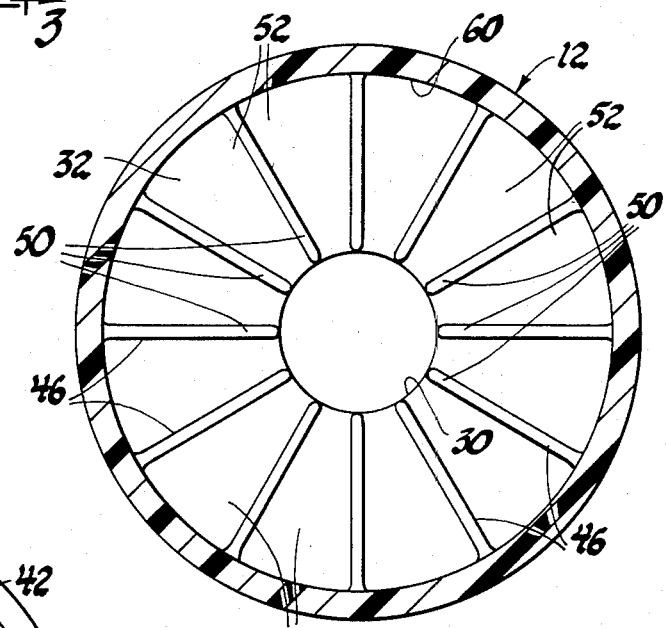
FIG. 2 is a view taken along the line 2—2 in FIG. 1.
Figure 3:
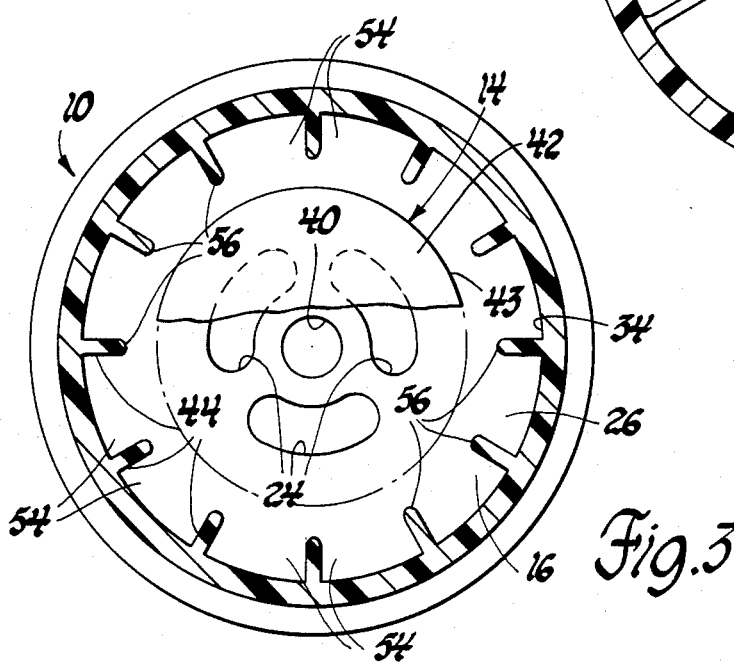
FIG. 3 is a view taken along the line 3—3 in FIG. 1.

The smaller size nipple 18 on the housing 10 has a central passage 22 which connects with the valve chamber 16 via three equally radially and angularly spaced and arcuately shaped inlet ports 24 formed in an interior radial end wall 26 in the housing 10 that defines one end of the valve chamber as seen in FIGS. 1 and 3. The larger size nipple 20 on the cover 12 on the other hand has a central passage 28 which connects with the chamber 16 via a central port 30 of equal diameter formed in an interior radial end wall 32 in the cover that defines the other end of the valve chamber as seen in FIGS. 1 and 2. The ports 24 in the housing 10 are adapted to serve as the inlet to the valve chamber while the port 30 in the cover 12 serves as the outlet. The housing 10 is formed with an interior cylindrical side wall 34 which joins with the interior radial end wall 26 to define an end cavity in the housing for receiving the umbrella valve 14 therein as well as cooperating with the other interior radial end wall 32 in the cover 12 to complete the formation of the thus cylindrically shaped valve chamber.

The umbrella valve 14 has an integral central stem 36 with a bulbous and pointed end 38 by which the valve is inserted and retained in a central hole 40 in the interior radial end wall 26 of the housing radially inward of the inlet ports 24. As installed and positioned, the circular head 42 of the valve extends over the inlet ports 24 and is preloaded along its periphery 43 against the end wall 26 to normally close the inlet ports. The valve at its head 42 is then deflectable in response to differential pressure acting in the direction of the arrows shown in FIG. 1 to assume the dash-line position 42' and thereby open these ports to permit flow therethrough in this direction to the chamber 16 and thence out through the outlet port 30. Then when the differential pressure acting in this direction is relieved or when the differential pressure acts in the opposite direction such as on the occurrence of backward flow, the elastomeric valve because of its preload assumes its normally closed position to prevent flow in the reverse or backward direction with the preload then assisted by the back pressure. Assuming the valve 14 remains attached by its stem 36 to the housing 10, the valve thus operates in a normal manner to permit flow in only one direction through the valve assembly. But for the valve chamber features now to be described, should the valve 14 become unattached from the valve housing such as the result of fatigue of the stem 36, the then unattached valve 14 could be forced by the fluid pressure to close the outlet port 30 thereby preventing the desired one-way flow as well as be out of position to be forced by back pressure to close on the inlet ports 24 to block any undesired backward flow when the normal preload is thus lost.

According to the present invention, the interior side wall 34 of the housing 10 is formed with a plurality of equally angularly spaced, radially inwardly projecting ribs 44 as shown in FIGS. 1 and 3 while the interior end wall 32 of the cover 12 is formed with a corresponding number of equally angularly spaced, axially inwardly projecting ribs 46 as shown in FIGS. 1 and 2. As also shown in FIG. 1, the radial ends 48 of the side wall ribs 44 extend in close proximity to the radial edges 50 of the ribs 46 on the interior end wall 32 of the cover 12. The latter ribs 46 extend outward from the inlet port 30 the entire radial dimension of the interior end wall 32 and define therebetween a plurality of radially extending channels 52 (see FIG. 2) which are open at their outer end to corresponding but axially extending channels 54 (see FIG. 3) defined by and between the side wall ribs 44.

The axially extending edges 56 of the side wall ribs 44 are equally radially spaced outward from the periphery of the valve head 42 a predetermined radial distance such that should the valve head become unattached from the housing 10 it is then retained by its peripheral engagement with one or more of the side wall rib edges 56 in an operational position to still overlay all the inlet ports 24 so that even though the preload is then lost, back pressure from the outlet port 30 will force the valve head against the interior end wall 26 to close the inlet ports and thereby prevent undesired backward flow.

Furthermore, the radial end wall channels 52 which are open at their inner end to the outlet port 30 and at their outer end to the axial side wall channels 54 maintain connection between the outlet port and the valve chamber 16 should the valve head 42 become unattached and be forced by fluid pressure from the inlet ports 24 toward the outlet port 30 since the radial edges 50 of the interior end wall ribs 46 will then fend off closure of the valve head on the outlet port at the interior end wall 32 so that the outlet port remains open to the valve chamber for the desired one-way flow from the inlet port.

For example, assuming the valve head 42 does become unattached for some reason and drops to the dash-line position 42" shown in FIG. 1, it is then retained by the axial edges 56 of the side wall ribs 44 that it then encounters in an operational position overlaying the inlet ports 24 so as to be forced to close thereon by reversal of differential pressure or backward flow from the outlet port 30. On the other hand and while in the unattached dash-line position 42", the radial end wall channels 52 in the cover 12 will remain open to provide bypass flow around the periphery of the unattached valve head and through the valve chamber from the inlet ports to the outlet port even though the unattached valve head is then being forced by the fluid pressure to close on the outlet port.

Preferrably, the housing 10 and cover 12 are made of a plastic material such as nylon while the umbrella valve 14 is made of an elastic material such as rubber or synthetic rubber-like material. Furthermore, the housing 10 and cover 12 are designed with a cylindrical telescoping shoulder 58 and collar 60 respectively which may be slip-fit together following attachment in the housing of the umbrella valve 14 and then simply joined by sonic welding to completely seal the valve chamber with a single joint. Moreover, it will be seen that the three parts are adapted by their design to production molding and automated assembly on a mass production basis. However, it will be appreciated that while the above construction is preferred, the shapes of the parts and fluid passages may take other forms in the above design solution that is taught to correct the problem of detachment of the umbrella valve.

The above described preferred embodiment is thus illustrative of the invention which may be modified within the scope of the appended claims.

The embodiments of the invention in which an exclusive property or privilege is claimed are defined as follows:

1. A check valve assembly having a valve chamber with an inlet port and an outlet port, an elastomeric umbrella valve contained in said chamber between said ports, a stem attaching said valve in a position to normally close said inlet port and be deflectable in response to differential fluid pressure acting in one direction to open said inlet port to permit forward fluid flow therethrough past said valve and through said chamber to said outlet port, inwardly projecting retention means in said chamber for retaining said valve in operational relationship with said inlet port in the event said valve becomes unattached so that any backward flow from said outlet port still forces closure of said valve on said inlet port, and bypass channel means in said chamber for maintaining forward fluid flow past said valve to said outlet port in the event said valve becomes unattached.

2. A check valve assembly having a valve chamber with an inlet port and an oppositely facing outlet port, an elastomeric umbrella valve with an integral stem contained in said chamber between said ports said stem attaching said valve in a preloaded condition to normally close said inlet port and be deflectable in response to differential fluid pressure acting in one direction to open said inlet port to permit forward fluid flow therethrough past said valve and through said chamber to said outlet port, said chamber having a side wall with inwardly projecting retention means for retaining said valve in operational relationship with said inlet port in the event said valve becomes unattached so that any backward flow from said outlet port still forces closure of said valve on said inlet port, and said chamber further having an end wall with bypass channel means for maintaining forward fluid flow past said valve to said outlet port in the event said valve becomes unattached.

3. A check valve assembly having a side wall and two oppositely facing end walls defining a valve chamber with an inlet port in one wall and an outlet port in the other end wall, an elastomeric umbrella valve with an integral stem contained in said chamber between said ports, said stem attaching said valve in a preloaded condition against said one end wall to normally close said inlet port and be deflectable in response to differential fluid pressure acting in one direction to open said inlet port to permit forward fluid flow therethrough past said valve and through said chamber to said outlet port, inwardly projecting retention means integral with said side wall for retaining said valve in operational relationship with said inlet port in the event said valve becomes unattached so that any backward flow from said outlet port still forces closure of said valve on said inlet port, and bypass channel means integral with said other end wall for maintaining forward fluid flow past said valve to said outlet port in the event said valve becomes unattached.

* * * * *